(12) United States Patent
St. John Williams et al.

(10) Patent No.: US 6,646,041 B2
(45) Date of Patent: Nov. 11, 2003

(54) AQUEOUS DISPERSION OF ADDITION POLYMER PARTICLES

(75) Inventors: Neal St. John Williams, Warfield (GB); Stephen Barry Downing, High Wycombe (GB)

(73) Assignee: Imperial Chemical Industries PLC (GB)

( * ) Notice: Subject to any disclaimer, the term of this patent is extended or adjusted under 35 U.S.C. 154(b) by 0 days.

(21) Appl. No.: 09/963,058

(22) Filed: Sep. 25, 2001

(65) Prior Publication Data

US 2003/0130408 A1 Jul. 10, 2003

(51) Int. Cl.[7] .............................................. C08L 33/00
(52) U.S. Cl. ...................................................... 524/522
(58) Field of Search ......................................... 524/522

(56) References Cited

U.S. PATENT DOCUMENTS

| | | |
|---|---|---|
| 4,427,819 A | 1/1984 | Wessling et al. |
| 4,560,714 A | * 12/1985 | Gajria et al. ................. 523/409 |
| 4,876,313 A | 10/1989 | Lorah |
| 4,886,852 A | 12/1989 | Numa |
| 5,451,641 A | 9/1995 | Eisenhart et al. |
| 5,889,101 A | 3/1999 | Schulz et al. |

FOREIGN PATENT DOCUMENTS

| | | |
|---|---|---|
| DE | 14 69 837 A | 1/1969 |
| EP | 0 300 612 | 1/1989 |
| SU | 226141 | 4/1969 |

OTHER PUBLICATIONS

Database WPI, Section Ch., Derwent Publications Ltd., London, GB; Class A00, AN 1968–38628Q, XP002154911 & SU 226 141 A (VL Kuznetsov (Lebedev Synth Rubber R) abstract.

* cited by examiner

Primary Examiner—Bernard Lipman
(74) Attorney, Agent, or Firm—Kenneth J. Stachel

(57) ABSTRACT

An aqueous dispersion of particles of an addition polymer of ethylenically unsaturated monomers which dispersion also contains a stabilizing copolymer of
  a) weak acid containing species
  b) crosslinking species and optionally
  c) ethylenically singly unsaturated comonomers
    wherein the stabilizing copolymer contains at least 0.3% of crosslinking species.

34 Claims, No Drawings

AQUEOUS DISPERSION OF ADDITION POLYMER PARTICLES

This invention relates to an aqueous dispersion of particles of an addition polymer of ethylenically unsaturated monomers, to a process for making the dispersion and to compositions containing the dispersions, especially a coating composition and an adhesive composition.

The continuing drive to reduce solvent emissions in many products, such as coating compositions and adhesives formulated at least in part using dispersions of polymer particles, has focussed attention on waterborne polymer particles, that is to say polymers which can be carried in water or mixtures of water and water miscible organic solvent where the water is the predominant carrier liquid. In this way potentially harmful solvents can be totally or substantially replaced by water. A particular class of such polymers is the so called emulsion (also known as latex) polymers made by emulsion polymerisation. Typically such a process involves the addition polymerisation of substantially water immiscible ethylenically unsaturated monomers using a water soluble polymerisation initiator in water. On raising the temperature, polymerisation takes place in the water phase producing substantially water insoluble polymer which, as polymerisation proceeds, increases in molecular weight until it becomes completely insoluble in the water and consequently precipitates to form a particle. In order to make such polymers as stable dispersions it is well known that water soluble surfactants are required to emulsify the monomers to be polymerised and subsequently to stabilise the resulting polymer particles as they are formed, otherwise the polymer particles will form coarse agglomerates, which cannot be formulated into useful products. Typical water soluble surfactants used are low molecular weight ionic or non ionic molecules having a hydrophobic and hydrophilic portion. Unfortunately, when the dispersion is converted to dried formulated products, for example as in the case of coatings and adhesives such water soluble surfactants remain in the composition resulting in poor resistance to water and humidity and contributing to flash rusting when applied directly to ferreous metals.

An attempt to overcome the poor water resistance was disclosed by United States patent specification U.S. Pat. No. 5,889,101 issued in 1999. U.S. Pat. No. 5,889,101 discloses a method whereby as a first stage a polymeric protective colloid of weight average molecular weight of at least 20,000 is made by free radical polymerisation in solvent, followed by a second stage polymerisation of monomers in the presence of the protective colloid to form a stable polymer dispersion which is free of low molecular weight surfactant. U.S. Pat. No. 5,889,101 cautions against the use of large amounts of crosslinking species, in this case particular types of multi-unsaturated monomers, when making the protective colloid and in particular teaches the use of no more than 0.2 wt % of them presumably to avoid the known risk of gelling. This results in only modest water resistance. This level of water resistance remains inadequate in some critical applications such as adhesives and coatings, especially paint compositions for painting motor vehicles (especially cars).

It has now been discovered that highly water resistant, stable aqueous dispersions of addition polymer particles can be made without using surfactants. This is achieved by using stabilizing solution copolymers containing amounts of crosslinking species which are significantly higher than previously proposed. Such dispersions when formulated into coatings result in substantially improved water resistance and improved flash rusting on bare steel.

Accordingly, this invention provides an aqueous dispersion of particles of an addition polymer of ethylenically unsaturated monomers which dispersion also contains a stabilizing solution copolymer comprising
  a) weak acid containing species
  b) crosslinking species and optionally
  c) ethylenically singly unsaturated comonomers
    wherein the stabilizing solution copolymer contains at least 0.3% by weight of crosslinking species.

It is believed that the presence of the crosslinking species results in a degree of copolymer chain branching and/or crosslinking during copolymerisation and reaction to form a branched stabilizing solution copolymer. A measure of this branching is the alpha parameter. This is determined in tetrahydrofuran (THF) at 23° C. using the technique described in detail later in the specification. The alpha parameter is indicative of the molecular structure of the stabilizing solution copolymer and under specified conditions of solvent and temperature alpha indicates the degree of branching. It is thought that too low a value of the alpha parameter means that the stabilizing solution copolymer is so highly branched that it behaves as a hard sphere, rendering it insufficiently dispersible in water and consequently inadequate as a stabiliser in an emulsion polymerisation, whilst too high a value of alpha means that the stabilizing solution copolymer is easily extractable by water and hence the water resistance of the dried formulations is poor.

Preferably the stabilizing solution copolymer has an alpha parameter derived from the Mark-Houwink equation of from 0.3–0.6 and more preferably from 0.3 to 0.5.

The invention also provides a stabilizing solution copolymer for use in the aqueous dispersions which is a copolymer of;
  a) weak acid containing species
  b) crosslinking species and optionally
  c) ethylenically singly unsaturated comonomers
    wherein the stabilizing solution copolymer contains at least 0.3% by weight of crosslinking species.

Preferably, the stabilizing solution copolymer is selected so as to have an alpha parameter derived from the Mark-Houwink equation of from 0.3–0.6 and more preferably from 0.3 to 0.5.

The crosslinking species referred to in b) is any species capable of reacting with the monomer of a) and c) to produce crosslinks and/or branches in the stabilizing solution copolymer.

Suitable examples of such crosslinking species include ethylenically multi-unsaturated monomers; that is to say, monomers that have more than one ethylenic unsaturation which can copolymerise with the other ethylenically unsaturated comonomers so as to form the crosslinks and/or branches described above. Such monomers are known as crosslinking comonomers. Examples of suitable such crosslinking comonomers include allyl methacrylate, vinyl acrylate, divinyl benzene, ethylene glycol dimethacrylate, di-allyl phthalate, hexane diol diacrylate, trimethylol propane triacrylate, penta erythritol triallyl ether, dicyclopentenyl oxyethyl methacrylate and glycerol triacryl ate.

Preferably the crosslinking comonomer contains two ethylenically unsaturated bonds.

The crosslinking species can also be a mixture of two ethylenically singly-unsaturated monomers each having a co-reactive functional group, sometimes referred to as a co-reactive monomer pair. It is thought that when such monomers copolymerise with the other ethylenically unsaturated monomers and the co-reactive functional groups on one polymer chain react with those of another polymer chain, crosslinks and/or branches are formed. When such a reaction takes place, the functional groups are substantially consumed. Suitable examples of such co-reactive functional groups include epoxy and carboxyl, anhydride and hydroxyl, isocyanate and hydroxyl, epoxy and hydroxyl, isocyanate and amine, acetoacetate and amine and alkoxysilane and hydroxyl. Examples of suitable monomers having an epoxy group are glycidyl methacrylate and glycidyl acrylate. Suitable examples of monomers having carboxyl groups include (meth)acrylic acid and beta-carboxyethyl acrylate. An example of a suitable monomer having an anhydride group is maleic anhydride. Suitable examples of monomers having hydroxyl groups include hydroxyethyl (meth)acrylate, hydroxypropyl (meth)acrylate and hydroxybutyl (meth) acrylate. An example of a monomer having an isocyanate group is 1-1 (isocyanato 1-methylethyl)-3-(1-methyl ethenyl) benzene. A suitable example of monomer containing an amine group is t-butylaminoethyl methacrylate. A suitable example of a monomer having a acetoacetate group is acetoacetoxyethyl (meth)acrylate. An example of a monomer having a alkoxysilane group is 3-(trimethoxysilyl) propyl (meth)acrylate.

In a further embodiment, the crosslinking species is a mixture of ethylenically singly-unsaturated monomer having a co-reactive functional group, as described above, and a multi-functional compound having two or more co-reactive functional groups and capable of reacting with the functional group of the monomer. Such multi-functional compounds, often referred to as crosslinking agents, do not contain ethylenic unsaturation and as such are incapable of copolymerising with the other ethylenically unsaturated comonomers.

Examples of suitable crosslinking agents include polyisocyanates, aminoplast resins and epoxide resins. Polyisocyanates are compounds having two or more isocyanate groups per molecule. Suitable diisocyanates are aliphatic or aromatic diisocyanates. Examples of suitable aliphatic diisocyanates are hexamethylene diisocyanate, isophorone diisocyanate and m-tetramethylxylene diisocyanate. Examples of suitable aromatic diisocyanates are toluene diisocyanate and 4,4'-diphenylmethane diisocyanate. Other suitable polyisocyanates include the isocyanurate trimers, allophanates and uretdiones of diisocyanates such as those described above as well as the reaction products of these diisocyanates with polyols containing three or more hydroxyl groups. Many such polyisocyanates are commercially available from Bayer under the Desmodur trademark, for example Desmodur™ N and from Rhodia under the Tolonate™ trademark, such as Tolonate™ HDT 90. The aminoplast resins include melamine formaldehyde and urea formaldehyde resins, suitable examples of which include Cymel™ 9370, Cymel™ 325, and Cymel™ 350. Suitable examples of the epoxide resins include Epikote™ 828, Epikote™ 1004 and the like.

Suitable examples of ethylenically singly-unsaturated species capable of reacting with the polyisocyanate, melamine formaldehyde and the urea formaldehyde crosslinking agents include hydroxy ethyl acrylate, hydroxy ethyl methacrylate and hydroxy butyl acrylate; suitable examples of ethylenically unsaturated species capable of reacting with the epoxide crosslinking agents include acrylic acid, methacrylic acid and tertiary butyl amino ethyl methacrylate.

The most preferred crosslinking species is allyl methacrylate.

The crosslinking species referred to in b) above preferably constitutes from 0.3 to 10%, more preferably from 0.5 to 8% and most preferably from 1 to 7% by weight of the stabilizing copolymer.

The acid containing species referred to in a) above are species containing weak acid groups. Such weak acid containing species include ethylenically unsaturated monomers having an acid group or its anhydride. Examples of suitable weak acid containing monomers are acrylic acid, methacrylic acid, beta carboxy ethyl acrylate, itaconic acid and crotonic acid. Examples of suitable ethylenically unsaturated acid anhydride containing monomers include succinic anhydride, maleic anhydride, and methacrylic anhydride. Other suitable acid containing species are initiators and chain transfer agents useful in polymerisation reactions. A suitable example of an acid containing initiator is 4,4' azobis(4-cyano-pentanoic acid). Suitable examples of acid containing chain transfer agents include mercapto propionic acid and thioglycolic acid. Preferably the pKa of the acid containing species is from 3 to 6, more preferably from 4 to 5.

Alternatively, acid containing species can be generated after polymerisation is substantially complete by reacting an acid anhydride with a hydroxyl group on the stabilizing copolymer. The hydroxyl group on the stabilizing copolymer can be provided by a hydroxyl containing monomer of the type mentioned above in relation to the crosslinking species. Suitable examples of acid anhydride include tri mellitic anhydride and phthallic anhydride.

Preferably the acid containing species comprises ethylenically unsaturated acid and/or acid anhydride monomers. More preferably the acid containing species of a) contains a carboxylic acid group or its anhydride. Most preferably the acid containing species is methacrylic acid.

The acid containing species referred to in a) above constitute from 2 to 30%, preferably from 5 to 25% and more preferably from 6 to 19% by weight of the stabilizing copolymer.

The stabilizing copolymer optionally contains ethylenically singly unsaturated comonomers as referred to in c) above. This allows the other characteristics such as hardness, cost, reactivity and solubility to be adjusted. Using the nomenclature (meth)acrylate to represent methacrylate and acrylate equally, examples of such comonomers are (meth)acrylic acid esters, amides and nitriles, vinyl monomers and vinyl esters.

Examples of (meth)acrylic acid esters are alkyl esters, particularly methyl (meth)acrylate, butyl (meth)acrylate, ethyl(meth)acrylate, ethylhexyl (meth)acrylate, propyl (meth)acrylate, lauryl (meth)acrylate, isobomyl (meth) acrylate, t-butyl (meth)acrylate, cyclohexyl (methacrylate), glycidyl methacrylate, hydroxyethyl(meth)acrylate, hydroxybutyl(meth)acrylate, hydroxypropyl(meth)acrylate, and poly(alkylene oxide) esters such as poly ethylene glycol methacrylate. Examples of nitriles are (meth)acrylonitrile. Examples of amide monomers include (meth)acrylamide. Examples of vinyl monomers are styrene and alpha methyl styrene. Examples of vinyl esters are vinyl $C_{1-4}$ alkanoate esters, especially vinyl acetate, vinyl propionate and vinyl butyrate; other vinyl esters include the vinyl versatates, which are the vinyl esters of versatic acid[1]. Examples of useful hydrophilic comonomers are hydroxyethylacrylate and alkoxy poly(oxyethylene)n (meth)acrylate, in which the $_n$ represents the molecular weight of the poly(oxyethylene) group and is typically from 500 to 3000.

[1] Versatic acid is a mixture of aliphatic monocarboxylic acids each containing an average of 9,10 or 11 atoms and is commercially available from the Shell Company at Carrington, England.

Preferred monomers are hydroxy ethyl acrylate, methoxy poly(oxyethylene)$_{2000}$ methacrylate, butyl acrylate and methyl methacrylate The further ethylenically singly unsaturated comonomers referred to in c) above preferably constitute from 60 to 97.7%, more preferably from 67 to 94.5% and most preferably from 74 to 93% by weight of the stabilizing copolymer.

The weight average molecular weight of the polymeric stabiliser is preferably 25,000 to 750,000, more preferably 40,000 to 500,000 and most preferably 40,000 to 200,000 as measured by Right Angle Laser Light Scattering (RALLS) as referred to later in the specification.

Preferably the glass transition temperature (Fox Tg) of the stabilizing copolymer is from −40 to +150° C. as calculated using the Fox equation.

The dispersed polymer particles may be particles of any addition polymer (including copolymers) of ethylenically unsaturated monomers.

Using the nomenclature (meth)acrylate to represent methacrylate and acrylate equally, examples of such ethylenically unsaturated monomers are acid and/or acid anhydride monomers of the type useful in making the stabilizing copolymer, (meth)acrylic acid esters, amides and nitriles, vinyl monomers, vinyl esters and crosslinking monomers. Examples of (meth)acrylic acid esters are alkyl esters, particularly methyl (meth)acrylate, butyl (meth)acrylate, ethyl(meth)acrylate, propyl (meth)acrylate, 2-ethyl hexyl acrylate and alkoxy poly(oxyethylene), (meth)acrylate. Examples of vinyl monomers are styrene and alpha methyl styrene. Examples of vinyl esters are vinyl $C_{1-4}$ alkanoate esters, especially vinyl acetate, vinyl propionate, vinyl butyrate and vinyl versatate. The monomers may also be crosslinking species of the same type which are useful in making the stabilizing copolymer and they are preferably present in amounts of from 1 to 5% by weight of the particle.

Preferred monomers are butyl acrylate, methyl methacrylate, butyl methacrylate, styrene, 2-ethyl hexyl acrylate, methoxy poly(oxyethylene)$_{2000}$ methacrylate and allyl methacrylate.

Preferably the Fox Tg of the polymer particles is from −40 to +150° C. in order to give easily applied coating compositions and adhesives.

Preferably the diameter of the polymer particles is from 10 to 500 nanometers, more preferably from 10 to 300 nanometers and most preferably from 10 to 100 nanometers. Particles of the lowest size are most preferred as they produce dried films, especially coatings, of greatest clarity. This is particularly advantageous in dyed or pigmented formulations where the greater clarity allows a wider and brighter range of colours to be produced.

The weight ratio of stabilizing copolymer to stabilised polymer is in the range from 5:95 to 95:5, preferably from 15:85 to 85:15, more preferably from 25:75 to 75 to 25.

The stabilizing copolymer is used in the preparation of the aqueous dispersions of addition polymer particles.

The stabilizing copolymer can be prepared using known free radical polymerisation methods carried out in solvents and initiated by free radicals at elevated temperature.

Suitable solvents are good solvents for the particular stabilizing copolymer composition in question. By good solvent is meant that the solvent readily dissolves the stabilizing copolymer composition. In practice it has been found that suitable solvents include organic solvents, preferably water miscible solvents or mixtures thereof. Examples of such solvents are 2-butoxy ethanol, propylene glycol monomethyl ether, 1-methoxy 2-propanol, 2,2,4-trimethyl 1,3-pentanediol monoisobutyrate and n-butanol. A preferred solvent is 2-butoxy ethanol as it is compatible with many polymers and is soluble in water.

By selecting such good solvents or solvent mixtures it is possible to make the stabilizing copolymer at commercially useful solids content of about 50% at a sufficiently low viscosity to enable easy handling. Inevitably, there is a practical upper limit to the solids content beyond which the viscosity is so high, or it gels, that the solution of stabilizing copolymer is, for all practical purposes unhandleable. This can only be determined by experiment and depends not only on the choice of solvent or solvent mixture, but also on the molecular weight of the stabilizing copolymer, level of crosslinking monomer and total non volatile (nv) content.

Suitable free radical initiators include peroxides, peresters and azobiscarbonitriles. Suitable examples of the peroxide initiators include hydrogen peroxide, t-butyl hydroperoxide, di-t-butyl peroxide, benzoyl peroxide and di-t-amylperoxide. Suitable examples of the perester initiators include butylperoxy-2-ethyl hexanoate and t-butyl peracetate. A suitable nitrile initiator is 2,2' azobis (2 methylbutyronitrile). Of course, initiators containing acid groups can be used as described above in relation to the acid containing species of the stabilizing copolymer. The amount of initiator used is typically from 0.1 to 7% by weight on monomers and preferably 0.5 to 5% by weight and most preferably from 0.5 to 2% by weight.

A suitable method to introduce the monomer mixture and the initiator into the reactor vessel is to add them over a period of from 2 to 6 hours, preferably from 2 to 4 hours.

Where the crosslinking species is a co-reactive monomer pair it is preferred to keep the monomers of the co-reactive monomer pair separate until added into the reactor during polymerisation in order to avoid premature reaction. A suitable method is to introduce one of the co-reactive monomers to the reactor vessel separately to the rest of the monomer mixture.

Where the crosslinking species is a mixture of ethylenically singly-unsaturated monomer and crosslinking agent, it is preferred to add the crosslinking agent seperately to avoid premature reaction. Optionally, the crosslinker may be added when polymerisation is substantially complete.

The polymerisation temperature is typically from 70 to 150° C. and preferably from 80 to 140° C.

The process for the preparation of the stable aqueous dispersion of addition polymer particles is one where the particles of addition polymer are made by a polymerisation carried out in the presence of the stabilizing copolymer.

In order for the stabilizing copolymer to efficiently emulsify the monomer mixture to be polymerised and to stabilise the polymer particles formed in the aqueous phase, the acid groups on the polymeric stabiliser are preferably at least partially neutralised by the addition of a base. Examples of suitable bases are alkali metal hydroxides and amines. Amines are most preferred as they have a minimum adverse affect on the properties of the dried formulated product, such as water resistance. Suitable amines include ammonia and primary, secondary and tertiary amines such as triethylamine and dimethyl ethanolamine.

Following the addition of base, the solution of stabilizing copolymer may be added to water in a reactor vessel and the monomer mixture introduced in the presence of a free radical polymerisation initiator.

A preferred process is to add the monomer mixture and the initiator into the reactor vessel over a period of from 2 to 6 hours, preferably from 2 to 4 hours. Preferably the monomer mixture is emulsified prior to addition to the reactor by mixing with water in the presence of a portion of the stabilizing copolymer. The amount of stabilizing copolymer used is typically from 0.01 to 20% by weight on monomer mixture and preferably from 0.5 to 10% by weight and most preferably from 1 to 5% by weight. The polymerisation is carried out by heating the mixture to a temperature typically from 30 to 98° C., preferably from 40 to 90° C.

Suitable emulsion polymerisation initiators include peroxides such as hydrogen peroxide and tertiary butyl hydroperoxide, persulphates such as potassium persulphate and anmmonium persulphate, and redox initiator combinations such as ascorbic acid and hydrogen peroxide. Optionally, metal salts such as copper, chromium and iron salts can be added when redox pairs are used.

Preferably the initiator is the redox combination of hydrogen peroxide and ascorbic acid as this enables the polymerisation to be carried out at reduced temperature and results in reduced fouling of the reactor vessel requiring less frequent cleaning.

The process is particularly useful for making composite dispersion polymer microparticles where the stabilizing copolymer is mainly found on the outside of the particle. It is thought that this is because the stabilizing copolymer prefers to be attached to a surface rather than exist in solution. During the polymerisation to form the dispersion polymer microparticles, it is further thought that the stabilizing copolymer migrates to the polymer particle surface to form the mantle with the polymer particle forming the core.

Important applications of the aqueous dispersion of polymer particles of this invention are in the field of adhesives, especially laminating adhesives and pressure sensitive adhesives; coatings suitable for painting wood, metal, plastics, walls, floors, ceilings, vehicles including motor vehicles, bicycles; the coatings may be formulated as primers, undercoats and topcoats including basecoats and clearcoats for painting vehicles.

Accordingly the invention also provides an aqueous coating composition wherein the composition contains an aqueous dispersion of polymer particles as described above.

The coating composition can also contain other ingredients that are standard for coatings such as pigments, rheological modifiers, dispersants, extenders, crosslinking agents, anti foams, flow aids and biocides.

The pigment can be any pigment or mixture of pigments suitable for use in an aqueous composition such as a solid colour pigment, a metallic pigment or a pearlescent pigment. Preferably the pigment is a metallic pigment, especially aluminium flake pigment, or a pearlescent pigment or a transparent pigment or a mixture of these optionally with other pigments.

Examples of suitable crosslinking agents are polyisocyanates and aminoplast resins such as melamine formaldehydes and urea formaldehydes as described above in reference to the crosslinking species. These can react with suitable chemical moieties on the particles and/or the stabilizing copolymer, such as hydroxyl groups so as to form a well integrated film structure of greater mechanical strength.

The coating compositions can be prepared by standard methods for example by mixing or high speed stirring with pigments and other ingredients that are standard for coatings.

The coating compositions can be applied by standard techniques for example by spraying or brushing.

Where the aqueous dispersion of polymer particles is used in an adhesive composition, said adhesive composition may also contain at least one component selected from the group consisting of tackifiers, solvents and plasticisers.

Determination of the Mark-Houwink Alpha Parameter

The Mark-Houwink alpha parameter is obtained from a plot of log(intrinsic viscosity) versus log(molecular weight) obtained from a single polydispersed polymer sample. This is achieved via gel-permeation chromatography (GPC) with triple detection (differential refractive index, viscosity and right-angle light scattering (RALLS)). The sample is firstly separated according to molecular size by the GPC column and then each slice of the resulting distribution is analysed for intrinsic viscosity and molecular weight by processing of the three detector signals in combination. The approximately linear region of the plot is fitted to a straight line and alpha derived from the slope. Where two approximately linear regions are seen the upper one is used for alpha.

The GPC system comprises a suitable column to separate the polymer (two 30 cm PLGEL 10 micron mix B available from Polymer Laboratories Ltd, Shropshire, UK) and a triple detection system available from Viscotek Corporation (Houston, Tex., 77060, USA). The detector signals are processed using Viscotek 'Trisec' software. The eluent used is tetrahydrofuran and the system is maintained at ambient temperature (23 +/−3° C.). Other conditions of sample concentration, injection volume and eluent flow rate are adjusted to give good chromatographic separation (here the conditions are 10 mg/ml of polymer, 100 microlitre injection volume, 1.0 ml/min eluent flow rate). Before each series of samples a polystyrene standard of narrow molecular weight distribution is injected in order to adjust for inter-detector delays, to normalise the refractive index and light-scattering signals and to calibrate the total refractive index signal for refractive index increment dn/dc. A polystyrene standard of wide molecular distribution is also run as a control sample to ensure that the correct molecular weight moments and alpha value (0.71) are produced by the system.

The Trisec software is used as instructed by the manufacturers to obtain the Mark-Houwink plot. It uses an iterative method based on the Fox-Flory equation to calculate an accurate molecular weight from the RALLS signal, using intrinsic viscosity to provide a correction for the finite angle used. It is necessary to select a model for the particle scattering function to do this. Here the random coil approximation is chosen. A single point method is used to derive intrinsic viscosity from viscosity and concentration for each slice.

The invention is further illustrated by the following Examples of which Examples A and B are comparative.

The tradenames listed below are used in the examples to denote the following:

DMAE is dimethylaminoethanol.
Vazo™ 67 is 2,2 azobis(2-methyl butyronitrile) initiator available from DuPont, Wilmington, USA.
Trigonox™ 21S is t-butyl peroxyethyl hexanoate initiator available from Akzo Nobel Chemicals, Gillingham, Kent, England.
Trigonox™ BPIC is tertiary butyl peroxy isopropyl carbonate initiator available from Akzo Nobel Chemicals, Gillingham, Kent, England.
Triton™ X405 is a non-ionic wetting agent available from Dow Europe, Horgen, Switzerland.
Orotan™ QR681M is pigment dispersant available from Rohm and Haas,
Bevaloid™ 6681 is an antifoam available from Rhodia Europe, France.
Microtalc™ AT Extra is available from Omya, Matlock, Derbyshire, UK.

Tioxide™ TR 92 is available from Huntsman Tioxide, London W14 0QL, UK.

Delaphos™2M is a zinc phosphate anticorrosive pigment available from Trident Alloys, Walsall, WS3 2XW, UK.

Neocryl™ XK62 is available from Neo Resins, Waalwijk, The Netherlands.

Pliotec™ LS1 is available from Goodyear Chemicals, Courtaboeuf, France

Aquamac™ 705 is available from McWhorter Technologies, Ill., USA

Texanol™ is available from Eastman Chemical Co, Kingsport, Tenn., USA

EXAMPLE 1

Preparation of Stabilising Copolymer Containing Crosslinking Comonomer as the Crosslinking Species Example 1 describes the method used to make the stabilizing copolymer 1 of the invention using the components listed in Table 1 below.

To a glass reactor equipped with an isomantle, an anchor stirrer, a glass condenser, and an injection port connected to two injection pumps was added the solvent and the temperature raised to 130° C. under an atmosphere of nitrogen. To the reactor was added a mixture of ethylenically unsaturated monomers and initiator as specified in Table 1. The monomer mixture and initiator feed were added at a uniform rate over a period of three hours using the injection pumps whilst maintaining the reactor contents at 130° C. The first initiator spike was added 30 minutes after the end of the feed. The second initiator spike was added after a further 30 minutes. The initiator spikes are added to ensure that the monomers have essentially polymerised completely to leave only very low levels of unreacted monomer. The temperature was maintained at 130° C. for a further hour and then allowed to cool to ambient temperature. Lastly, the contents were decanted to provide the stabilizing copolymer.

EXAMPLE 2 AND COMPARATIVE VXAMPLES A AND B

Example 2 and Comparative examples A and B were made using the ingredients listed in Table 1 according to the above method except that the temperature was reduced to 90° C. in order to achieve similar weight average molecular weights. Examples 1 and 2 contain 1 and 0.4 weight % respectively of crosslinking co-monomer and comparative examples A and B contain 0 and 0.2 weight % respectively.

TABLE 1

Composition and Characterisation of Stabilising Polymers

|  | Stabilising Copolymer | | Comparative Stabilising Copolymer | |
| --- | --- | --- | --- | --- |
|  | 1 | 2 | A | B |
| Solvent Charge | Wt (g) | Wt (g) | Wt (g) | Wt (g) |
| 2-butoxy ethanol | 990.93 | 1436.49 | 1519.02 | 1436.49 |
| Monomer Feed | | | | |
| Butyl Acrylate | 1593.26 | 1248.99 | 1187.73 | 1252.02 |
| Hydroxy ethyl acrylate | 194.30 | 151.21 | 152.34 | 151.21 |
| Methacrylic acid | 136.01 | 105.85 | 106.62 | 105.85 |
| Allyl Methacrylate | 19.43 | 6.05 |  | 3.02 |

TABLE 1-continued

Composition and Characterisation of Stabilising Polymers

|  | Stabilising Copolymer | | Comparative Stabilising Copolymer | |
| --- | --- | --- | --- | --- |
|  | 1 | 2 | A | B |
| Solvent Charge | Wt (g) | Wt (g) | Wt (g) | Wt (g) |
| Initiator Feed | | | | |
| 2 butoxy ethanol | 52.46 | 40.83 | 26.95 | 40.83 |
| Vazo 67 | 9.72 | 7.56 | 2.99 | 7.56 |
| Mop-up Initiator Spikes | | | | |
| Trigonox 21S | 1.94 | 1.51 |  | 1.51 |
| Trigonox 21S | 1.94 | 1.51 |  | 1.51 |
| Trigonox BPIC |  |  | 2.17 |  |
| Trigonox BPIC |  |  | 2.17 |  |
| Total | 3000 | 3000 | 3000 | 3000 |
| Process temperature | 130° C. | 90° C. | 90° C. | 90° C. |
| Theoretical solids % | 65 | 50 | 50 | 50 |
| Viscosity (Pa.s) | 1.5 | 0.7 | 0.6 | 0.62 |
| Molecular weight (Mw) | 41,920 | 47,400 | 46,510 | 42,060 |
| Alpha parameter | 0.42 | 0.63 | 0.69 | 0.64 |

Viscosity was measured using an ICI cone and plate viscometer at 10000 s$^{-1}$.

The low value of the alpha parameter for example 1 indicates that the stabilizing copolymer is branched.

EXAMPLE 3

Preparation of the Stable Aqueous Dispersion of Addition Copolymer Particles Using the Stabilizing Copolymer of Example 1

Example 3 describes the method used to make the aqueous dispersion of copolymer particles from components as specified in Table 2, using the stabilizing copolymer of example 1.

To a glass reactor equipped with an anchor stirrer, a glass condenser, two injection ports each connected to an injection pump and fitted with a water bath are added in the following order, the stabilizing copolymer, DMAE and demineralised (demin) water, comprising the reactor charge and the temperature raised to 50° C. Nitrogen is bubbled through the reactor charge (also known as sparging) for 30 minutes. During this period the monomer mixture is prepared by adding all the components except the hydrogen peroxide, in the order shown, to a container vessel. This monomer mixture is mixed for 15 minutes under high shear using a high shear Silverson homogeniser to produce a fine emulsion. The hydrogen peroxide is then stirred into the monomer mixture. At the end of the 30 minute nitrogen sparge the addition of the monomer mixture and the co-initiator feed is started, the addition being made over 3 hours at an even rate using the injection pumps. At the end of the feeds the temperature is maintained at 50° C. for a further hour. The resulting aqueous dispersion of addition polymer particles is cooled to below 35° C. and decanted.

EXAMPLE 4 AND COMPARATIVE EXAMPLES C AND D

The aqueous dispersions of example 4 and comparative examples C and D were made using the same process as indicated above except that the stabilizing copolymers of examples 2, A and B respectively were used as specified in Table 2.

TABLE 2

Composition and Characterisation of Aqueous Dispersion Polymer Examples 3,4,C and D Aqueous Dispersion Example Number Example

| Material | 3 Wt (g) | 4 Wt (g) | C Wt (g) | D Wt (g) |
|---|---|---|---|---|
| Aqueous Charge | | | | |
| Stabilising copolymer A | | | 389.58 | |
| Stabilising copolymer B | | | | 492.56 |
| Stabilising copolymer 2 | | 492.56 | | |
| Stabilising copolymer 1 | 521.13 | | | |
| DMAE | 14.91 | 14.21 | 14.49 | 14.21 |
| Demin water | 1547.67 | 1575.37 | 1653.83 | 1575.37 |
| Monomer Emulsion Feed | | | | |
| Stabilising copolymer A | | | 43.29 | |
| Stabilising copolymer B | | | | 54.72 |
| Stabilising copolymer 2 | | 54.72 | | |
| Stabilising copolymer 1 | 57.89 | | | |
| DMAE | 1.65 | 1.58 | 1.61 | 1.58 |
| Methyl methacrylate | 154.53 | 154.93 | 157.90 | 154.93 |
| Butyl acrylate | 727.05 | 728.93 | 742.89 | 728.93 |
| Allyl Methacrylate | 27.29 | 27.36 | 27.89 | 27.36 |
| Demin water | 661.60 | 663.31 | 676.02 | 663.31 |
| Hydrogen peroxide | 4.82 | 4.83 | 4.93 | 4.83 |
| Co-Initiator Feed | | | | |
| Ascorbic acid | 2.55 | 2.56 | 2.61 | 2.56 |
| DMAE | 1.28 | 1.28 | 1.30 | 1.28 |
| Demin water | 277.64 | 278.35 | 283.69 | 278.35 |
| Total | 4000 | 4000 | 4000 | 4000 |
| Theoretical solids % | 30 | 30 | 30 | 30 |
| Particle Size (nm) | 131 | 123 | 70.8 | 120 |
| Coagulum (%) | None | None | None | None |

The particle sizes were measured on an Coulter N4 Plus Dynamic Light Scattering machine. High shear viscosity was measured on an ICI viscometer and all lay between 14 and 22 mPa·s. Low shear viscosity was measured on a Brookfield viscometer using a No. 1 spindle at 6 rpm and all lay between 11 and 16 mPa·s.

Water Spot Resistance Testing

The dispersions were drawn down using a 150 micron block spreader on glass panels and left to dry at 24° C. for 2 days. A 1 ml drop of water was applied and covered with a plastic lid for 30 minutes. The films were then wiped dry with a tissue and assessed for whitening.

TABLE 3

Water Spot Resistance Testing

| Dispersion Polymer | Stabilising copolymer composition | Result |
|---|---|---|
| C | A | Very white |
| D | B | Slightly white |
| 3 | 1 | Unaffected |
| 4 | 2 | Very Slightly white |

EXAMPLES 5 AND 6

Preparation of Further Stabilising Copolymer and Aqueous Dispersion of Addition Polymer Particles.

Example 5 is a stabilizing copolymer made using the ingredients listed in Table 4 below according to the method of example 1.

TABLE 4

Example 5

| Solvent Charge | Wt (g) |
|---|---|
| 1-methoxy 2-propanol | 1034.48 |
| Monomer Feed | |
| Styrene | 356.72 |
| Methyl Methacrylate | 332.82 |
| Butyl Acrylate | 648.16 |
| Hydroxy ethyl Acrylate | 178.36 |
| Allyl Methacrylate | 17.84 |
| Methacrylic acid | 249.70 |
| Initiator Feed | |
| 1-methoxy 2-propanol | 160.52 |
| Vazo 67 | 17.84 |
| Mop-up Initiator Spikes | |
| Trigonox 21S | 1.78 |
| Trigonox 21S | 1.78 |
| Process temperature | 120° C. |
| Theoretical solids % | 60 |
| Viscosity (Pa.s) | 13.5 |
| Molecular weight (Mw) | 42020 |
| Alpha parameter | 0.52 |

The stabilizing copolymer of example 5 was used in the preparation of the stable aqueous dispersion of addition polymer particles of example 6 made using the ingredients listed in Table 5 below. The same process is used as described in example 3 other than the polymerisation initiator being added as a single shot imunediately prior to the monomer feed beginning and that four initiator spikes were added at 30 minute intervals to ensure the monomers had reacted.

TABLE 5

Example 6

| Aqueous Charge | Wt (g) |
|---|---|
| Stabilising Copolymer 5 | 188.87 |
| Ammonia solution (880) | 9.26 |
| Demin water | 411.08 |
| Initiator shot prior to feed | |
| Trigonox 21S | 2.60 |
| Monomer Emulsion Feed | |
| Butyl Acrylate | 9.89 |
| Butyl Methacrylate | 510.46 |
| Stabilising Copolymer 5 | 62.96 |
| Ammonia solution (880) | 3.09 |
| Demin water | 1198.20 |
| Mop-up Spikes | |
| Trigonox 21S | 0.65 |
| Trigonox 21S | 0.65 |
| Trigonox 21S | 0.65 |
| Trigonox 21S | 0.65 |
| Process temperature | 80° C. |

TABLE 5-continued

Example 6

| Aqueous Charge | Wt (g) |
|---|---|
| Theoretical Solids % | 45 |
| Particle size (nm) | 139 |
| Coagulum % | 1.4 |

COMPARATIVE EXAMPLES E, F AND G

Three commercially available aqueous dispersions, each recommended for use in coatings where good water resistance and anti-corrosion properties are required, were selected. These are comparative examples E (comprising Pliotec LSI), F (comprising Aquamac 705) and G (comprising Neocryl XK 62). They are made using conventional stabilisers or surfactants; that is to say not of the invention

Testing

The aqueous dispersion of example 6 was compared to Comparative examples E, F and G, by carrying out the tests described below. For each test the aqueous dispersions were either used neat or formulated into a coating composition in accordance with the procedure described below.

The results are shown in Table 6.

TABLE 6

| Aqueous dispersion | Flash Rusting | Water soak 0 hr | Water soak 16 hr | Exudate | Salt Bath (Aq Disp) | Salt Bath (Primer) |
|---|---|---|---|---|---|---|
| E | NO | 5 | 5 | YES | 1 | Did not form coherent film |
| F | NO | 5 | 5 | NO | 1 | 2 |
| G | YES | 2 | 1 | NO | 5 | 5 |
| 6 | NO | 3 | 1 | NO | 3 | 2 |

The tests were carried out as described below.

Flash rusting—A quantity of each of the aqueous dispersions is poured over degreased, mild steel panels held at about 45°, any excess being allowed to run off. The presence or absence of surface rusting on each panel is assessed at 5 minutes after pouring.

Water Soak—To example 6 and comparative aqueous dispersions E, F and G was added 15 weight % on nv of Texanol (2,2,4-Trimethyl-1,3 pentanediol monoisobutyrate) and sufficient associative thickener Acrysol RM 2020 (available from Rohm and Haas) to achieve a viscosity of 0.2Pa·s (as measured at $10,000s^{-1}$ using an ICI Cone and Plate viscometer). These clear coatings were block spread on degreased mild steel panels and allowed to dry for 1 week. The dry film weight was approximately 30 $\mu$m. The coated panels were immersed in water at a temperature of 40° C. for 10 days and assessed immediately after removal and also after being allowed to recover for 16 hours, as indicated in the table by the 0 and 16 hr figures respectively.

The following scale is used to quantify the amount of whitening that the films suffer 1=Clear-unaffected
2=Slight blush
3=Blush/grey
4=White
5=White/opaque The coated panels were also assessed for evidence of an oily/waxy exudate on the surface of the coating following the water soak test.

Salt Bath-Panels coated with thickened aqueous dispersions (Aq Disp) as above were also tested by immersing them for 24 hours in a 5 wt % aqueous solution of sodium chloride solution at 23° C.

The following scale was used to quantify the amount of rusting that the films suffered.

1=Unaffected
2=Slight rusting
3=Moderate rusting
4=Heavy rusting
5=Heavy rusting and blisters Comparative aqueous dispersions E, F and G and example 6 were converted to primer coatings H, I and J respectively, according to the formulations below, drawn down on degreased, bare mild steel panels to a dry film thickness of 60 $\mu$m and immersed in the sodium chloride solution described above for 24 hours at 23° C. The same scale was used to assess the degree of rusting as for the thickened aqueous dispersions above.

TABLE 7

Primer formulations

| | H Weight % | I Weight % | J Weight % |
|---|---|---|---|
| Millbase | | | |
| Triton X-405 | 0.16 | 0.16 | 0.16 |
| Orotan QR681M | 0.92 | 0.92 | 0.92 |
| Bevaloid 6681 | 0.06 | 0.06 | 0.06 |
| Demineralised water (1) | 2.88 | 2.88 | 2.88 |
| Demineralised water (2) | 12.69 | 21.03 | 14.95 |
| Tioxide TR92 | 7.13 | 7.13 | 7.11 |
| Microtalc AT extra | 15.41 | 15.41 | 15.36 |
| Delaphos 2M | 5.99 | 5.99 | 5.97 |
| Aqueous Dispersion | | | |
| G | 51.5 | | |
| F | | 43.21 | |
| 6 | | | 49.35 |
| Cosolvent | | | |
| Texanol | 3.24 | 3.24 | 3.23 |

The millbase was prepared by grinding the ingredients in Table 7 in a high speed disperser, known as a Dispermat, for 30 minutes and then gradually adding the aqueous dispersion and cosolvent as indicated whilst stirring.

The primer formulation for aqueous dispersion E is not shown as it would not film form when applied to the panel and hence was not tested.

Referring to Table 6, the best overall performing aqueous dispersion across the range of tests is example 6. In particular, its performance in all areas is at least acceptable and generally excellent without any test results being poor. This is in complete contrast to the test results for the comparative aqueous dispersions which each have unacceptable properties making them very difficult to formulate practical compositions of adequate performance.

What is claimed is:

1. An aqueous dispersion comprising:
    particles of an addition polymer of ethylenically unsaturated monomers; and a stabilizing solution copolymer comprising:
a) weak acid containing species
b) crosslinking species and optionally
c) ethylenically singly unsaturated comonomers; and
wherein the stabilizing solution copolymer contains at least 0.3% of crosslinking species.

2. An aqueous dispersion according to claim 1 wherein the stabilizing solution copolymer is selected to have an alpha parameter derived from the Mark-Houwink equation of from 0.3 to 0.6.

3. An aqueous dispersion according to claim 1 wherein the weight average molecular weight of the stabilizing solution copolymer is from 25,000 to 750,000.

4. An aqueous dispersion according to any one of the preceding claims wherein the crosslinking species of b) are crosslinking comonomers selected from allyl methacrylate, vinyl acrylate, divinyl benzene, ethylene glycol dimethacrylate, di-allyl phthalate, hexane diol diacrylate, trimethylol propane triacrylate, penta erythritol triallyl ether, dicyclopentenyl oxyethyl methacrylate and glycerol triacrylate.

5. An aqueous dispersion according to any one of the preceding claims wherein the crosslinking species of b) are crosslinking comonomers which contain only two ethylenically unsaturated bonds.

6. An aqueous dispersion according to any one of the preceding claims wherein the acid containing species of a) contains a carboxylic acid group or its anhydride.

7. An aqueous dispersion according to claim 1 wherein the acid containing species of a) constitute from 2 to 30% by weight of the stabilizing solution copolymer.

8. An aqueous dispersion according to claim 7 wherein the acid containing species of a) are selected from the group consisting of acrylic acid, methacrylic acid, beta carboxy ethyl acrylate, itaconic acid and crotonic acid.

9. An aqueous dispersion according to claim 1 wherein the stabilizing solution copolymer comprises acid containing species, crosslinking species and also ethylenically singly unsaturated comonomers.

10. An aqueous dispersion according to claim 9 wherein the ethylenically singly unsaturated comonomers of c) constitute from 60% to 97.7% by weight of the stabilizing solution copolymer.

11. An aqueous dispersion according to either claim 9 or claim 10 wherein the ethylenically singly unsaturated comonomers of c) are selected from the group consisting of hydroxy ethyl acrylate, methoxy poly(oxyethylene)$_{2000}$ methacrylate, butyl acrylate and methyl methacrylate.

12. An aqueous dispersion according to any one of the preceding claims wherein the polymer particles are particles of a polymer or copolymer of monomers chosen from the group consisting of butyl acrylate, methyl methacrylate, butyl methacrylate, styrene, 2-ethyl hexyl acrylate, methoxy poly(oxyethylene)$_{2000}$ methacrylate and allyl methacrylate.

13. A stabilizing solution copolymer comprising:
a) weak acid containing species
b) crosslinking species and optionally
c) ethylenically singly unsaturated comonomers; and
wherein the stabilizing solution copolymer comprises at least 0.03% crosslinking species.

14. A process for the preparation of a stabilizing solution copolymer comprising:
polymerizing monomers of a weak acid containing species and a cross linking species in the presence of a free radical initiator; and
wherein the monomers are polymerized in the presence of a solvent.

15. A process for the preparation of an aqueous dispersion comprising:
polymerizing particles of addition polymers of ethylenically unsaturated monomers in the presence of a stabilizing solution copolymer;
wherein the stabilizing solution copolymer comprises;
a) weak acid containing species
b) crosslinking species and optionally
c) ethylenically singly unsaturated comonomers; and
wherein the stabilizing solution copolymer contains at least 0.3% of crosslinking species.

16. A process according to claim 15 wherein the stabilizing solution copolymer is at least partially neutralized.

17. A process according to any one of claims 14 to 16 wherein the polymerisation is initiated by hydrogen peroxide and ascorbic acid.

18. An aqueous coating composition comprising:
an aqueous dispersion comprising:
particles of an addition polymer of ethylenically unsaturated monomers; a stabilizing solution copolymer comprising:
a) weak acid containing species
b) crosslinking species and optionally
c) ethylenically singly unsaturated comonomers; and
wherein the stabilizing solution copolymer contains at least 0.3% of crosslinking species.

19. An aqueous coating composition according to claim 18 wherein the composition contains also at least one component selected from the group consisting of pigments, Theological modifiers, dispersants, extenders, crosslinking agents, anti foams, flow aids and biocides.

20. An adhesive composition comprising:
an aqueous dispersion comprising:
particles of an addition polymer of ethylenically unsaturated monomers; a stabilizing solution copolymer comprising:
a) weak acid containing species
b) crosslinking species and optionally
c) ethylenically singly unsaturated comonomers; and
wherein the stabilizing solution copolymer contains at least 0.3% of crosslinking species.

21. An aqueous dispersion according to claim 1 wherein the stabilizing solution copolymer comprises a good solvent.

22. An aqueous dispersion according to claim 21 wherein the good solvent is selected from the group consisting of: 2-butoxy ethanol, propylene glycol monomethyl ether, 1-methoxy 2-propanol, 2,2,4-trimethyl 1,3 pentanediol monoisobutyrate, n-butanol and mixtures thereof.

23. An aqueous dispersion according to claim 1 wherein the stabilizing solution copolymer contains no surfactant.

24. A process according to claim 15 wherein the polymerization is initiated by hydrogen peroxide and ascorbic acid.

25. A process according to claim 15 wherein the stabilizing solution copolymer is prepared by polymerizing monomers of a weak acid containing species and a crosslinking species in the presence of good solvent.

26. A process according to claim 25 wherein the good solvent is selected from the group consisting of: 2-butoxy ethanol, propylene glycol monomethyl ether, 1-methoxy 2-propanol, 2,2,4-trimethyl 1,3 pentanediol monoisobutyrate, n-butanol and mixtures thereof.

27. A process according to claim 14 wherein the stabilizing solution copolymer contains no surfactant.

28. A process according to claim 15 wherein the stabilizing solution copolymer contains no surfactant.

29. An aqueous dispersion according to claim 1 wherein:
the weak acid containing species is selected from the group consisting of weak acid containing species constituting 5 to 25% of the copolymer; weak acid containing species constituting 6 to 19% of the copolymer; and
the crosslinking species is selected from the group consisting of: a crosslinking species constituting 0.3 to 10% of the stabilizing solution copolymer; a crosslinking species constituting 0.5 to 8% of the stabilizing solution copolymer, or a crosslinking species constituting 1 to 7% of the stabilizing solution copolymer.

30. An aqueous dispersion according to claim 9 wherein the ethylenically singly unsaturated comonomers are selected from ethylenically singly unsaturated comonomers selected from the group consisting of:
ethylenically singly unsaturated comonomers constituting 67 to 94.5% of the stablilising copolymer, and ethylenically singly unsaturated comonomers constituting 74 to 93% of the stablilising copolymer.

31. An aqueous dispersion according to claim 1, wherein the stabilizing solution copolymer is selected from the group consisting of: stabilizing solution copolymer having weight average molecular weight from 40,000 to 500,000, and stabilizing solution copolymer having weight average molecular weight from 40,000 to 200,000.

32. An aqueous dispersion according to claim 1, wherein the stabilizing solution copolymer has a glass transition temperature from −40 to +150 degrees Centigrade.

33. An aqueous dispersion according to claim 1, wherein the weight ratio of stabilizing solution copolymer to stabilised polymer is in the range from 5:95 to 95:5.

34. An aqueous dispersion according to claim 1, wherein the stabilizing solution copolymer has a solids content of about 50%.

* * * * *